(12) United States Patent
Hoffmann

(10) Patent No.: US 9,732,927 B2
(45) Date of Patent: Aug. 15, 2017

(54) METHOD FOR CALIBRATING A LIGHTING APPARATUS

(71) Applicant: HELLA KGaA Hueck & Co., Lippstadt (DE)

(72) Inventor: Ingo Hoffmann, Berlin (DE)

(73) Assignee: HELLA KGAA HUECK & CO., Lippstadt (DE)

( * ) Notice: Subject to any disclaimer, the term of this patent is extended or adjusted under 35 U.S.C. 154(b) by 0 days.

(21) Appl. No.: 15/060,962

(22) Filed: Mar. 4, 2016

(65) Prior Publication Data

US 2016/0257241 A1   Sep. 8, 2016

(30) Foreign Application Priority Data

Mar. 4, 2015   (DE) .................. 10 2015 203 889

(51) Int. Cl.
*F21S 8/10*   (2006.01)
*G01M 11/06*   (2006.01)
*B60Q 1/14*   (2006.01)
*H05B 33/08*   (2006.01)

(52) U.S. Cl.
CPC .......... *F21S 48/1715* (2013.01); *B60Q 1/143* (2013.01); *F21S 48/1154* (2013.01); *F21S 48/1731* (2013.01); *F21S 48/1747* (2013.01); *G01M 11/064* (2013.01); *H05B 33/0842* (2013.01); *B60Q 2200/38* (2013.01); *B60Q 2300/337* (2013.01); *B60Q 2300/41* (2013.01); *B60Q 2300/42* (2013.01)

(58) Field of Classification Search
CPC .. H05B 37/02; H05B 33/0857; H05B 33/086; H05B 33/0869; H05B 33/0842; H05B 33/0845; H05B 33/0866; G01M 11/064; G01M 11/081; G01M 11/068; G01J 3/50; G01J 3/462; F21V 19/02; F21V 23/0471; F21V 23/0478; F21S 48/10; F21S 48/1159; F21S 48/17; F21S 48/1747; F21S 48/1154; F21S 48/1241; B60Q 2200/38; B60Q 2300/337; B60Q 2300/41; B60Q 2300/42
USPC .... 315/152, 307, 312, 77, 82; 362/230, 231, 362/276, 802
See application file for complete search history.

(56) References Cited

U.S. PATENT DOCUMENTS

| 7,358,929 B2 * | 4/2008 | Mueller .................. E04F 13/08 345/1.1 |
| 7,478,922 B2 * | 1/2009 | Garbus, Jr. ............... G01J 3/46 362/230 |
| 9,046,237 B2 * | 6/2015 | Stefanov ................. F21S 48/17 |
| 9,061,631 B2 | 6/2015 | Totzauer |

(Continued)

FOREIGN PATENT DOCUMENTS

| DE | 10 2012 004 817 A1 | 9/2013 |
| DE | 10 2012 007 908 A1 | 10/2013 |

(Continued)

OTHER PUBLICATIONS

German Search Report, Application No. DE 10 2015 203 889.0, Dec. 9, 2015, 8 pgs.

*Primary Examiner* — Haissa Philogene
(74) *Attorney, Agent, or Firm* — Paul D. Strain, Esq.; Strain & Strain PLLC

(57) ABSTRACT

The invention relates to a method for calibrating a lighting apparatus, particularly lighting apparatus for a motor vehicle.

29 Claims, 15 Drawing Sheets

(56) References Cited

U.S. PATENT DOCUMENTS

| | | | |
|---|---|---|---|
| 9,261,428 B2 | 2/2016 | Hoffmann | |
| 2012/0206050 A1* | 8/2012 | Spero | B60Q 1/04 315/152 |

FOREIGN PATENT DOCUMENTS

| | | |
|---|---|---|
| DE | 10 2012 022 282 A1 | 5/2014 |
| DE | 10 2013 201 876 A1 | 8/2014 |

* cited by examiner

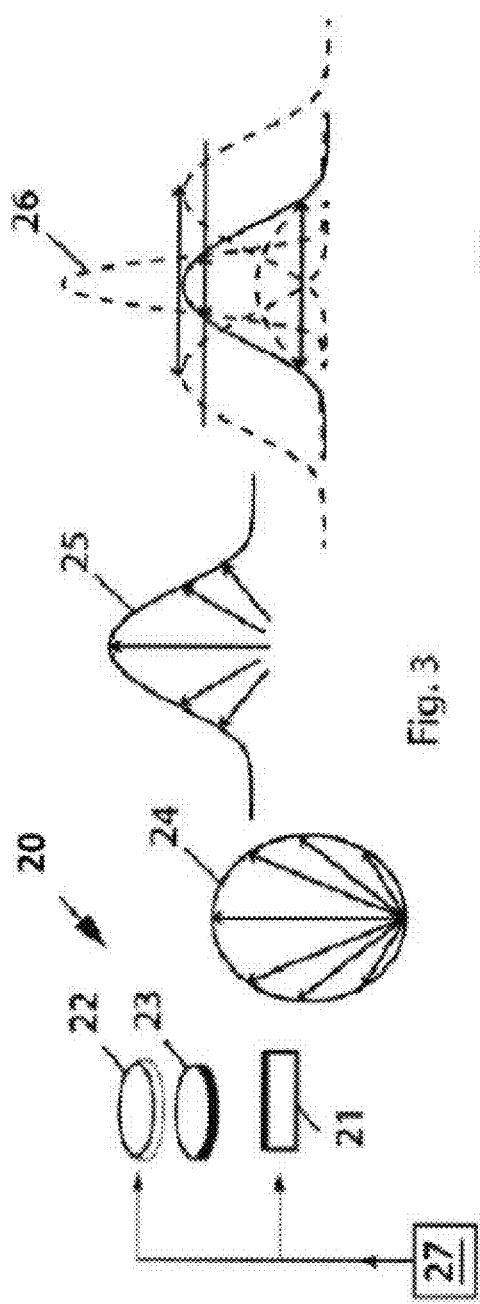
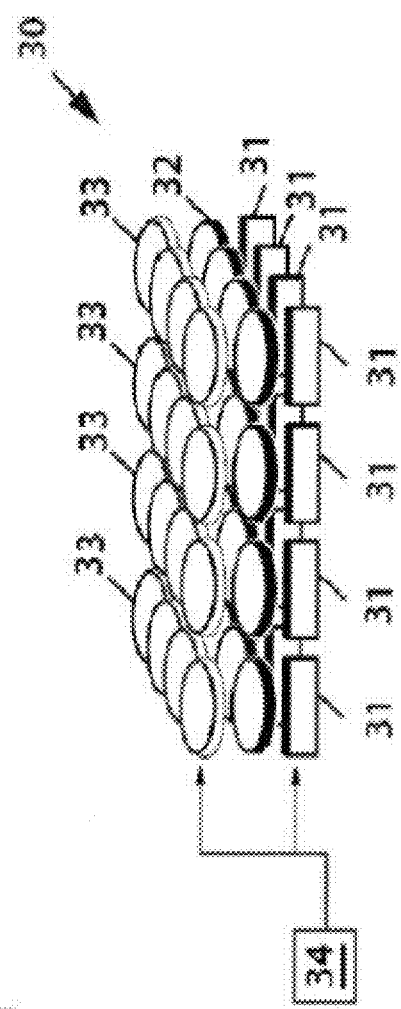

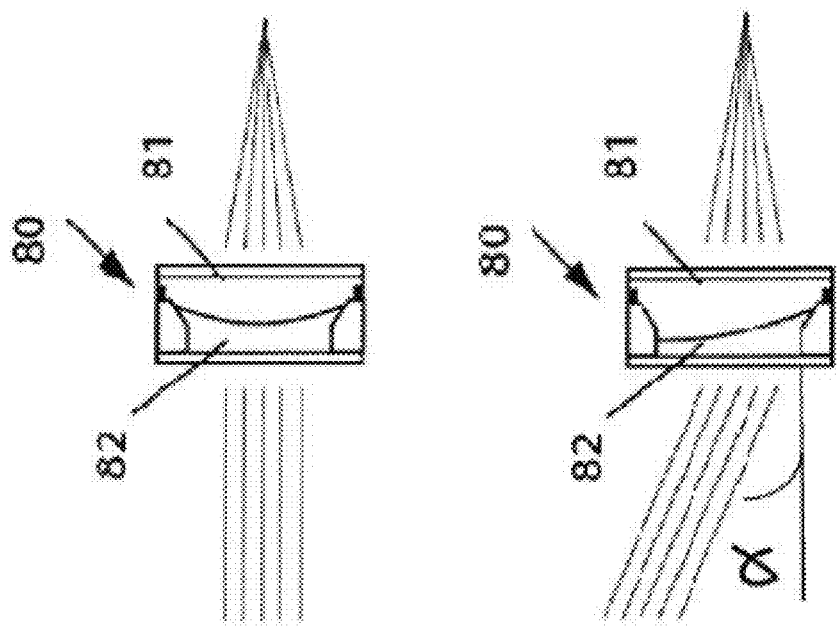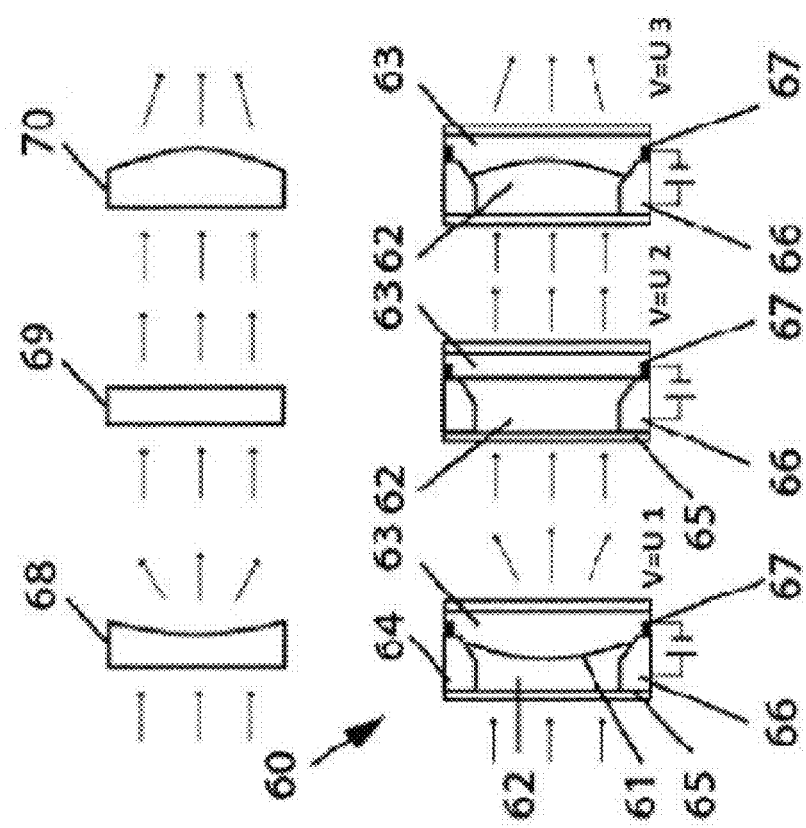

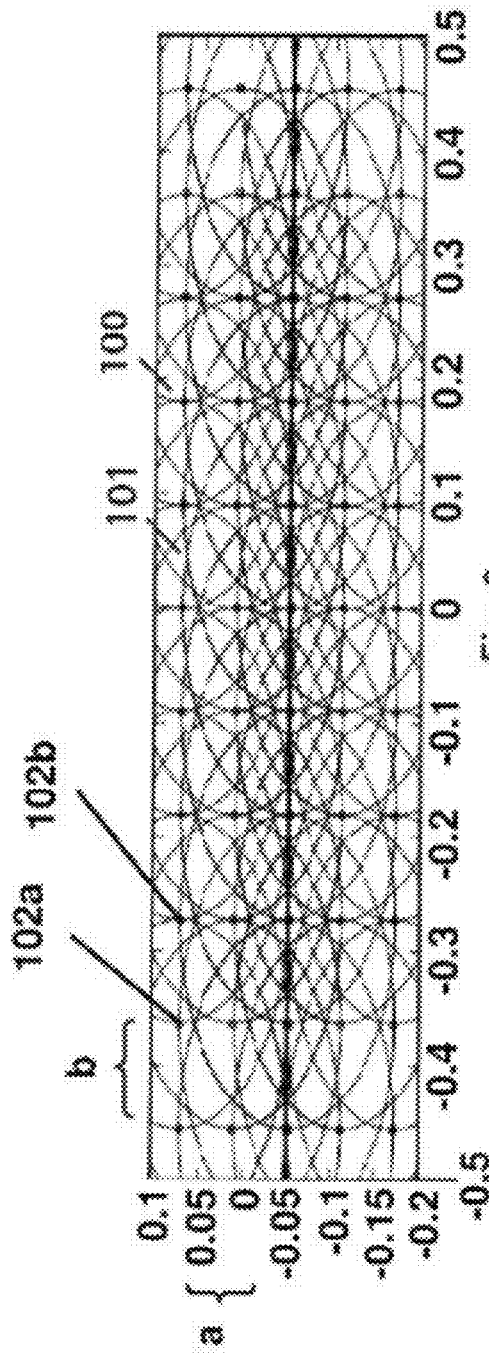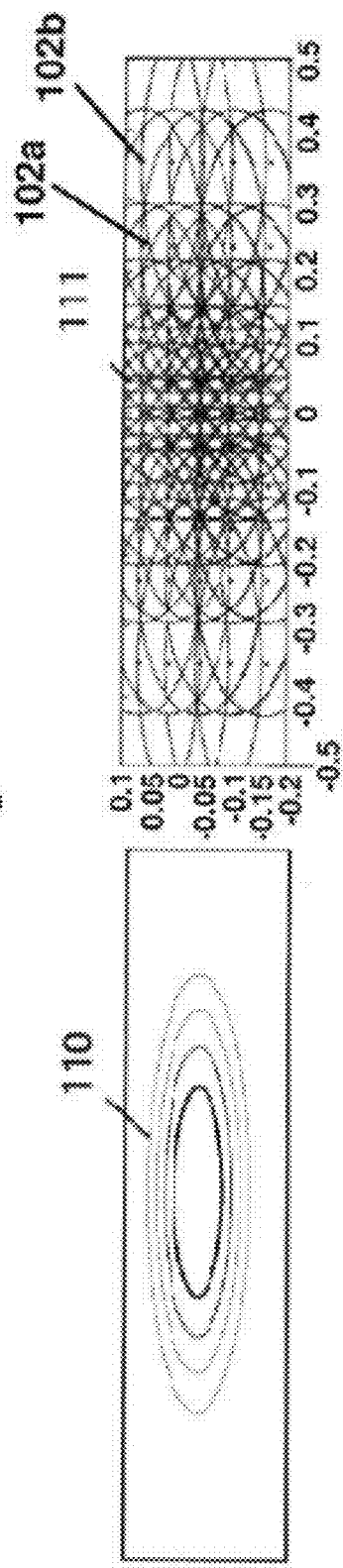
Fig. 8
Fig. 9

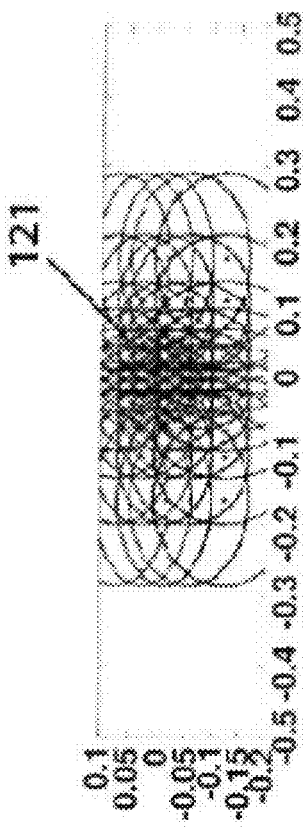
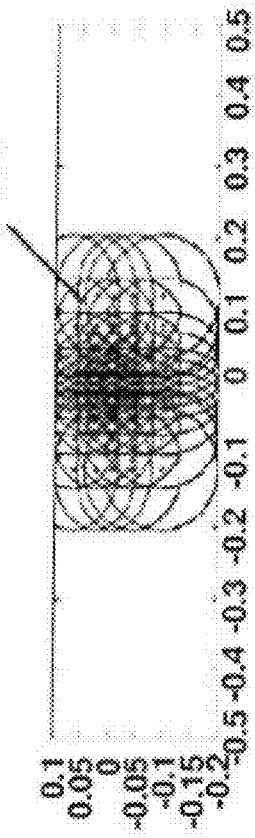
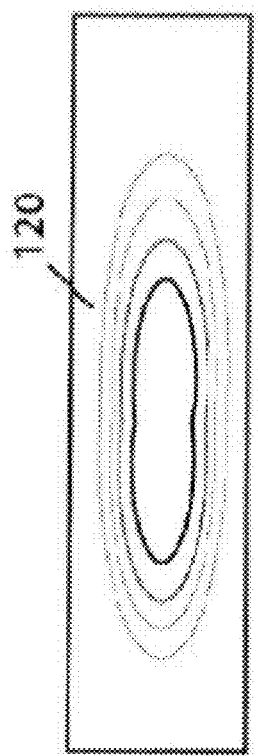
Fig. 10
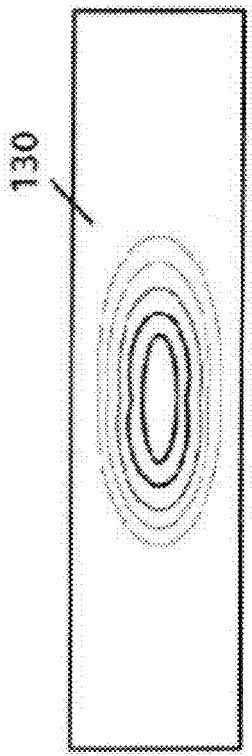
Fig. 11

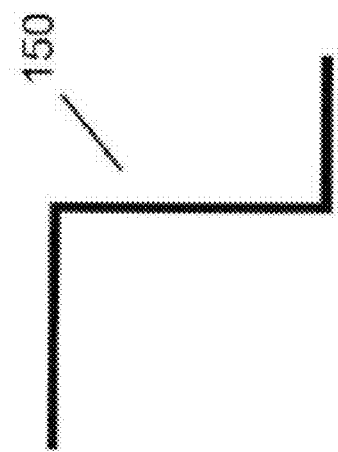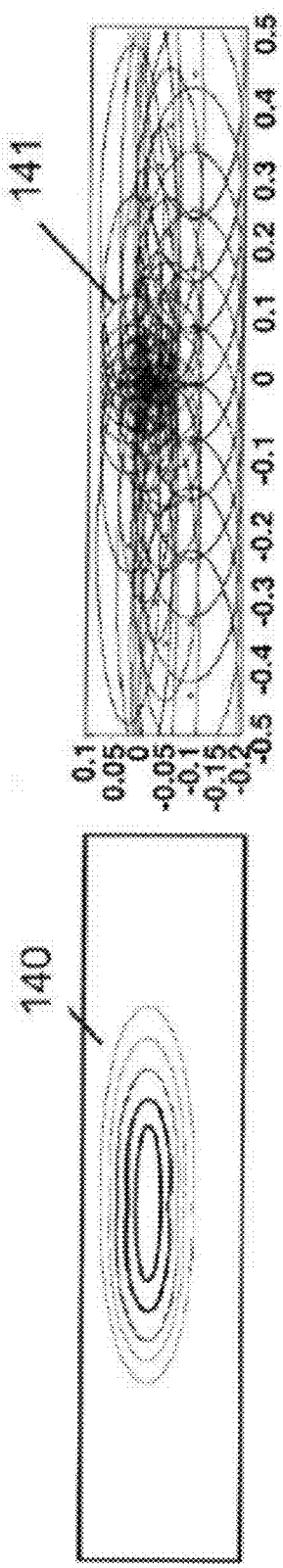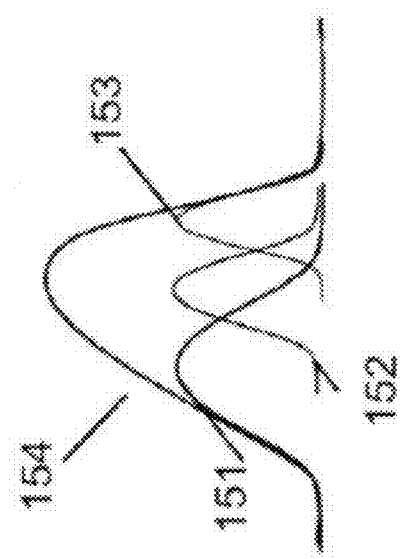
Fig. 12
Fig. 13

METHOD FOR CALIBRATING A LIGHTING APPARATUS

CROSS-REFERENCE TO RELATED PATENT APPLICATIONS

This application is based upon and claims the benefit of priority from prior German Patent Application No. 10 2015 203 889.0, filed Mar. 4, 2015, the entire contents of which are incorporated herein by reference in their entirety.

TECHNICAL FIELD

The invention relates to a method for calibrating a lighting apparatus, particularly a lighting apparatus for a motor vehicle.

PRIOR ART

Lighting apparatuses have become known as headlamps for motor vehicles, for example, which are arranged on the front of a vehicle and can produce different lighting variants. Thus, headlamps can produce a parking light, a low beam or a high beam, which is used to light the region or the roadway in front of the motor vehicle.

In this case, headlamps each having a fixed illuminant as light source for the respective light are known. These headlamps are not adjustable to the respective traffic situation. Headlamps having a swivelable illuminant or having an associated optical system have also become known that are swivelable as cornering lights for cornering, for example. In this case, the light intensity of the respective illuminant is not adjustable to suit the traffic situation, however.

Furthermore, headlamps having an adaptive bright/dark boundary have become known. In this case, the light distributions are produced by resorting to data from the vehicle surroundings. A camera detects oncoming vehicles and vehicles ahead, for example a stepping motor is used to rotate a cylinder, for example in what is known as a VarioX module, into the required position within a few milliseconds. This has the advantage that it allows the beam of light to end directly in front of the oncoming vehicles or behind the vehicles ahead.

Furthermore, a dazzle-free full beam has become known. In this case, the automobile driver drives on full beam continuously. When the camera provided detects other road users, they are cut out of the full beam distribution, for example in the form of a tunnel, using vertical bright/dark boundaries. The number of tunnels is limited in this case, however, on the basis of the design.

In addition, LED matrix headlamps have become known, in which a matrix of controlled-intensity LED elements is provided, with individual fixed matrix elements being disconnectable or connectable in order to produce the parking light, the low beam, the daytime running light, the high beam and/or multiple horizontal and/or vertical bright/dark boundaries, particularly to form tunnels. In this case, the emitted light is adjusted to suit the respective traffic situation only to a limited extent, however, by dint of LED matrix elements being disconnected and connected. The number of tunnels that can be produced is dependent on the number of LED elements provided. As a result, the emitted light is variable only to a limited extent. In this case, the LED elements each light solid angle ranges of their own without overlap or with only slight overlap. In order to be able to produce a largely homogeneous light distribution and a required number of bright/dark boundaries, there is furthermore a need for a large number of LED elements, which results in a high level of production complexity and in high susceptibility to error. Furthermore, cornering lights may require further light sources to be arranged in the lateral regions of the vehicle.

LCD matrix headlamps have also become known, in which LCD elements are used to produce backlighting, this backlighting needing to be suitably attenuated in order to obtain a desired light distribution. This means that power in the order of magnitude of 70% or more needs to be eliminated because, of the 100% of the amount of light produced, approximately 70% needs to be eliminated again in order to achieve the desired light distribution.

The trend is therefore moving toward more automation and toward better lighting of the region or of the roadway in front of the motor vehicle, because this achieves improved comfort and an increase in safety. Lighting adjusted to suit traffic conditions can also be used to achieve improved energy efficiency.

In this case, the calibration of the lighting apparatus is important so that the lighting apparatus produces a defined light distribution.

Calibration of a headlamp has been disclosed by DE 10 2010 006 190 A1, for example, in which a horizontal or vertical position for a light distribution is used in order to provide a driver of the motor vehicle with a notification message to prompt adjustment.

DE 10 2013 201 876 A1 has likewise disclosed a method for calibrating a headlamp, in which a bright/dark boundary for a light distribution is utilized.

However, these methods relate only to the overall light distribution of a headlamp and are unsuitable for calibrating single lighting elements.

PRESENTATION OF THE INVENTION, PROBLEM, SOLUTION AND ADVANTAGES

It is therefore the object of the invention to provide a method for calibrating a lighting apparatus that is simple to implement but nevertheless achieves safe calibration of the lighting apparatus.

In addition, it is also an object of the present invention to provide a method for actuating a lighting apparatus that correctly produces prescribable light distributions during operation directly after production and as its life progresses.

In addition, it is the object to provide a control apparatus that can be used to perform at least one of the two aforementioned methods.

The object according to the invention in relation to the calibration method is achieved by means of the features of Claim 1.

An exemplary embodiment of the invention relates to a method for calibrating a lighting apparatus, wherein the lighting apparatus has a plurality of illuminants as light sources that each produce an individual light distribution, control means for controlling the settings of the individual light distributions to produce a superimposed overall light distribution by dint of superimposition of the individual light distributions of at least single illuminants, additionally characterized by the production of an essentially overlap-free distribution of the individual light distributions of at least single selected illuminants, pickup of the light distribution of the selected illuminants by means of a sensor, determination of at least one characteristic of the picked-up individual light distributions of the selected illuminants, calibration of the lighting apparatus on the basis of a comparison of the at least one characteristic of different illuminants among one another and/or with prescribable setpoint data.

As a result, it is possible to ensure that, for example at the end of production or assembly of the lighting apparatus or possibly even over the life of the lighting apparatus, the illuminants are calibrated, so that lighting by the lighting apparatus does not result in disturbing effects and possibly disturb other road users.

The object according to the invention in relation to the method for actuating the lighting apparatus is achieved by means of the features of claim 2.

An exemplary embodiment of the invention relates to a method for actuating a lighting apparatus, wherein the lighting apparatus has a plurality of illuminants as light sources that each produce an individual light distribution, having control means for controlling the settings of the individual light distributions to produce a superimposed overall light distribution by dint of superimposition of the individual light distributions of at least single illuminants, additionally characterized by the production of an essentially overlap-free distribution of the individual light distributions of at least single selected illuminants at a selected time, pickup of the light distribution of the selected illuminants by means of a sensor, determination and storage of at least one characteristic of the picked-up individual light distributions of the selected illuminants, actuation of the lighting apparatus during operation based on the at least one characteristic.

As a result, it is possible to ensure that, even with tolerances in production and alterations during operation, prescribable light distributions are correctly producible. These tolerances can relate to all adjustable properties of the lighting elements. In this case, the characteristic is advantageously chosen such that at least one adjustable property of the lighting elements can be derived therefrom. In particular, it is advantageous if these are directly selectable and/or adjustable properties of the illuminants.

An overlap-free distribution can be produced by dint of deactivation of the unselected illuminants and/or by dint of adjustment of the setting of the at least single selected illuminants.

It is particularly advantageous if the actuation involves a setpoint value for the characteristic being compared with the actual value and the difference being used for control. As a result, it is possible for control of the lighting apparatus to be performed directly on the basis of the headlamp properties without the need for conversion from calibration data to take place.

In addition, it is advantageous if the illuminants are provided with means for setting the direction of radiation of the individual light distribution and/or with means for setting the focusing of the individual light distribution. As a result, the illuminants are particularly adjustable and can therefore be calibrated and/or actuated particularly well. Thus, prescribable light distributions can be correctly set despite incorrectly set individual light distributions in comparison with the initial setting, particularly the orientation and focusing. In addition, it is thus also possible to use the setting of the direction of radiation and/or the focusing of the individual light distribution of the individual light distribution to perform setting for overlap-free distribution in order to be able to perform the calibration.

In this case, it is particularly advantageous if the illuminants are in a form such that the intensity of the individual light distribution is adjustable, the respective intensity of the individual light distribution of the illuminants being controllable by the control means. Thus, it is also possible to use the setting of the intensity of the individual light distribution to perform setting for overlap-free distribution in order to be able to perform the calibration.

In addition, the adjustability of the illuminants can be increased further thereby, which means that the individual light distributions of the illuminants can thus be combined more flexibly, taking account of existing adjustments, to produce a superimposed overall light distribution.

It is also advantageous if the calibration of the lighting apparatus is setting and/or the actuation is control of the direction of radiation of the individual light distribution from at least one illuminant or all illuminants and/or of the focusing of the individual light distribution from at least one illuminant and/or from all illuminants and/or of the intensity of the individual light distribution from at least one illuminant or from all illuminants. Thus, it is possible for at least one illuminant, particularly some or all illuminants, to be calibrated. The effect achieved by this is that the setting of the at least one illuminant or of all illuminants can be performed such that said illuminant or said illuminants produces or produce an individual light distribution that corresponds to the setpoint values. These may be initial setpoint values and/or setpoint values that are needed at this time on the basis of the situation.

It is also advantageous if the calibration of the lighting apparatus is setting and/or the actuation is control of the direction of radiation of the individual light distribution from at least one of the selected illuminants or all selected illuminants and/or of the focusing of the individual light distribution from at least one of the selected illuminants and/or from all selected illuminants and/or of the intensity of the individual light distribution from at least one of the selected illuminants or from all selected illuminants. Thus, it is advantageously possible for selected illuminants to be calibrated. The effect achieved by this is that the setting of the selected illuminants can be performed such that they produce an individual light distribution that corresponds to the setpoint values.

In this case, it is particularly advantageous if the characteristic is a center or focus of an individual light distribution. In this case, it is possible for this characteristic to be advantageously ascertained simply in the data, particularly the image, and/or in a data sequence, particularly the image sequence from the sensor, when said characteristic is typically the maximum in the intensity, or it is possible for it to be determined from the geometric circumstances of the individual light distribution. In this case, particularly the position of the centers can be ascertained and evaluated.

It is also advantageous if the characteristic is an expansion and/or a profile of the light distribution. This expansion and/or profile can likewise be determined, optically or geometrically, in the data, particularly the image, and/or in a data sequence, particularly the image sequence from the sensor, and evaluated as appropriate. In this case, it is particularly possible for a magnitude to be determined. In addition, it is possible to ascertain and evaluate an expansion in different directions, particularly horizontally and/or vertically.

It is also advantageous if the comparison is a comparison of centers and/or expansion parameters and/or profile parameters from light distributions that are ascertained from different illuminants. These can also be determined optically or geometrically and evaluated as appropriate.

In this case, the position of the individual centers and/or focuses in comparison with the position of other centers and/or threshold values can be used to ascertain an alteration in the orientation in comparison with the correct orientation, particularly as a difference. The alteration can be used to calibrate and/or to actuate the lighting apparatus.

In addition, the magnitude of the individual expansion in comparison with other magnitudes can be used to ascertain an alteration in the focusing in comparison with the correct focusing, particularly as a difference. The alteration can be used to calibrate and/or to actuate the lighting apparatus.

In addition, it is advantageous to ascertain and compare the expansion in different directions, and in particular it is possible to ascertain and compare a horizontal expansion and a vertical expansion. The dimension of the difference can be used to ascertain an altered orientation.

It is particularly advantageous if the comparison is used to examine at least one regularity. This may be a regularity particularly in relation to the arrangement of the centers, in relation to the magnitude of the expansion or in relation to a combination of the position and the magnitude. To examine the regularity, it is particularly advantageously possible for the distance from adjacent centers to be ascertained and compared. In addition, it is advantageous to determine the regularity in relation to predetermined axes of symmetry or points by evaluating a symmetry for the characteristics. In particular, in the case of a matrix arrangement, a regularity can be examined by checking a row-by-row and/or column-by-column arrangement and/or a formation of the actual values of the characteristics that is consistent at least on a region-by-region basis.

In addition, it is expedient if the comparison is a comparison of centers and/or expansion parameters and/or profile parameters from light distributions that are compared with setpoint positions, setpoint expansions and/or setpoint profiles. In this case, it is possible for a difference between a setpoint value and an actual value to be ascertained, so that the ascertained discrepancy can be established and can be reduced by dint of appropriate correction through actuation of the illuminant.

In this case, particularly the position of the individual centers and/or focuses in comparison with setpoint positions for the centers and/or threshold values can be used to ascertain an alteration in the orientation in comparison with the setpoint orientation, particularly as a difference. The alteration can be used to calibrate and/or to actuate the lighting apparatus.

In addition, the magnitude of the individual expansion in relation to setpoint magnitudes illuminants can be used to ascertain an alteration in the focusing in comparison with the setpoint focusing, particularly as a difference. The alteration can be used to calibrate and/or to actuate the lighting apparatus.

In addition, it is advantageous to ascertain the expansion in different directions and to compare it with setpoint values; in particular, it is possible to ascertain a horizontal expansion and a vertical expansion and to compare them with setpoint values. The dimension of the difference can be used to ascertain an altered orientation, which can be used to calibrate and/or to actuate the lighting apparatus.

In this case, it is particularly advantageous if the production of an essentially overlap-free distribution of the individual light distributions is performed over an area in front of the vehicle. As a result, the resultant overall light distribution from the individual light distributions can be produced particularly without distortion and picked up by a sensor, such as a camera or the like, and evaluated by a control unit. Alternatively, range data, which are obtained by rangefinding, are used to compute a distortion-free overall light distribution. In addition, it is possible for a resultant distortion to be compensated for when the illuminants are actually actuated, so that a distortion-free overall light distribution and/or distortion-free individual light distributions can be produced even on uneven ground.

In this case, it is particularly advantageous if the area is an at least essentially even area that has a horizontal or vertical profile, in particular. As a result, a distortion-free overall light distribution is produced that can also be safely picked up by a sensor. Alternatively, range data, which are obtained by rangefinding, are used to compute a horizontally and/or vertically distortion-free overall light distribution. In addition, it is possible for a resultant horizontal and/or vertical distortion to be compensated for when the illuminants are actually actuated, so that a distortion-free overall light distribution and/or distortion-free individual light distributions can be produced even on areas that have a nonhorizontal and/or nonvertical profile, particularly that are tilted or sloping.

In this case, it is also advantageous if the area is a selected area or is a subregion of a selected area in which the operation of the headlamp is essentially unimpaired and/or the driver of the vehicle and/or other road users are not disturbed or influenced. Thus, the area may be an area in front of the vehicle that may not be identifiable to the driver during normal operation or that may not be lit during normal operation. As a result, an area would be used for the calibration that would not normally be used, which would also have the advantage of producing no irritations in the process, because the visually identifiable element of the calibration does not come into a region that is important.

It is also advantageous if the area is not visible to the driver of the vehicle. As a result, the driver is advantageously also not influenced, which means that he would also not be distracted from the current traffic, for example.

It is also expedient if the method for calibration is performed cyclically in multiple calibration cycles. Thus, the calibration of the lighting apparatus and/or the ascertainment of the control parameter can be performed in steps. In this case, the process of calibrating the lighting apparatus can be performed repeatedly in cycles in order to be able to check the calibration repeatedly.

It is also advantageous if the method for calibration is performed such that only a portion of the illuminants of the lighting apparatus are calibrated in a calibration cycle, different calibration cycles involving accordingly different portions of the illuminants being calibrated. The effect that can be achieved by this is that after a number of calibration cycles, the calibration has been performed completely and can begin again in the subsequent calibration cycle.

In this case, it is accordingly advantageous if after a complete pass through the calibration cycles, essentially all illuminants are calibrated. As a result, after such a complete calibration cycle, it is possible to ensure that the whole lighting apparatus has been calibrated.

It is also expedient if the selected illuminants for calibration are selected such that they are currently not used to produce a light distribution that is needed on account of the situation, particularly on account of function or traffic, or such illuminants are used but they are at least intermittently replaced by other illuminants. It is thus possible to perform calibration without disturbing the current overall light distribution that is needed for the current operating situation. In the case of the first alternative, only the illuminants that are currently not needed are calibrated. In the other alternative, even illuminants that are currently used are calibrated, the lighting function of these illuminants being replaced at least briefly by that of other illuminants.

It is also advantageous if only one individual light distribution for an illuminant at a time is calibrated in a calibration cycle. The effect achieved by this is that when the illuminant to be calibrated is currently used, the disturbance to the overall light distribution is kept small if this illuminant is actuated otherwise for calibration. This also simplifies the calibration process if, in this case, the other illuminants are switched off or have had their intensity reduced.

It is particularly advantageous if the production of the overlap-free distribution of the individual light distributions is performed in at least one of various settings for the illuminants. As a result, the illuminant can advantageously be calibrated to a particular setting. Alternatively, the calibration can also be performed in different settings of an illuminant, for example in succession, in order to improve the quality of the calibration.

In this case, it is advantageous if the setting that is set is a central position, a, in particular extreme, swivel position, a, in particular extreme, focusing and/or an, in particular extreme, expansion. As a result, the calibration can be performed in particularly easily adjustable and identifiable settings, which improves the quality of the calibration.

It is also possible for the calibration to be performed not only when the setting of the individual light distribution is constant over time, but rather it can alternatively also be performed when a dynamic setting for the individual light distribution or for the light distributions is performed.

It is thus possible for swiveling and/or circling and/or expansion and contraction of the individual light distributions to be set. As a result, it is possible to assess not only the absolute position but also the dynamics of the setting of the individual light distributions.

It is particularly advantageous if the calibration of a lighting apparatus and/or the ascertainment of control parameters for a motor vehicle is performed, the calibration and/or the ascertainment of control parameters being performed when the motor vehicle is at a standstill. By way of example, this can be performed during the production or assembly of the lighting apparatus or of a motor vehicle, in a workshop, garage, etc., and, in so being, can advantageously be initiated in automated fashion or manually.

It is also advantageous if the calibration and/or the ascertainment of control parameters for a lighting apparatus of a motor vehicle is performed, the calibration and/or the ascertainment of control parameters being performed during a driving situation of the motor vehicle. In this case, it is particularly advantageous if the calibration and/or the ascertainment of control parameters are performed without disturbing the functionality of the lighting apparatus for the current operating or traffic situation. Particularly when not all illuminants are needed for producing the overall light distribution, when there is currently no traffic situation classified as critical and/or when there is notification of a miscalibration by the driver, another road user and/or by a camera-based function check.

It is also additionally advantageous if a comparison is followed by a discrepancy in an individual light distribution for a selected illuminant from a setpoint value being established, from which a correction value for actuating the selected illuminant is determined, so that the discrepancy is reduced. As a result, identification of the discrepancy is followed by the initiation of a control measure that is used to correct the setting.

If the setting cannot be corrected because there is a fault relating thereto, it may also be advantageous if the illuminant is shut down and instead a different illuminant is actuated such that it undertakes the function of the illuminant that has been shut down.

In addition, it is also advantageous if the correction value or the alternative actuation is stored and is used or taken into account during operation of the illuminant.

Further advantageous embodiments are described by the description of the figures that follows and by the subclaims.

BRIEF DESCRIPTION OF THE DRAWINGS

The invention is explained in more detail below on the basis of at least one exemplary embodiment with reference to the figures of the drawing, in which:

FIG. 3 shows a schematic illustration of an example of a lighting apparatus, FIG. 4 shows a schematic illustration of a further example of a lighting apparatus, FIG. 6 shows illustrations to explain a liquid lens arrangement, FIG. 7 shows illustrations to explain a liquid lens arrangement, FIG. 8 shows an illustration of an example of an overall light distribution that arises from a superimposition of individual light distributions, FIG. 9 shows an illustration of a further example of an overall light distribution that arises from a superimposition of individual light distributions, FIG. 10 shows an illustration of a further example of an overall light distribution that arises from a superimposition of individual light distributions, FIG. 11 shows an illustration of a further example of an overall light distribution that arises from a superimposition of individual light distributions, FIG. 12 shows an illustration of a further example of an overall light distribution that arises from a superimposition of individual light distributions, FIG. 13 shows an illustration to explain the production of a bright/dark boundary or an edge in the light distribution.

PREFERRED EMBODIMENT OF THE INVENTION

Figure 1:
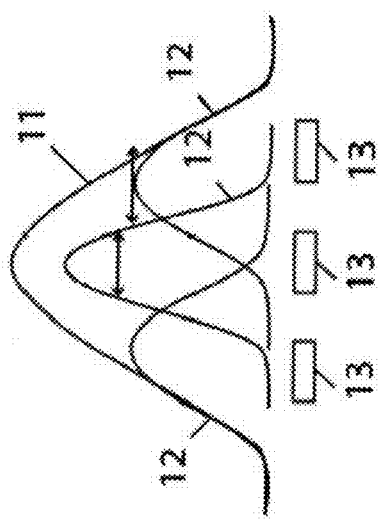
FIG. 1 shows a schematic illustration of an example of an overall light distribution.

FIG. 1 shows a two-dimensional view of an overall light distribution 1 that is obtained from three individual light distributions from two single illuminants 3. In this case, the intensity profile the individual light distributions 2 from the illuminants 3 is in the form of a Gaussian curve by way of example, so that the superimposition of the individual light distributions 2 results in an overall light distribution 1 that is flat in the central region.

Figure 2:
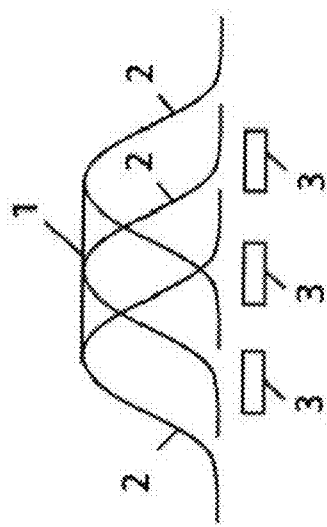
FIG. 2 shows a schematic illustration of a further example of an overall light distribution.

FIG. 2 shows a further example of an overall light distribution 11 in a two-dimensional illustration, in which the overall light distribution 11 is produced by three individual light distributions 12. The individual light distributions result from the illuminants 13. The individual light distributions 12 are set such that the two outer individual light distributions have a lower intensity but broader focusing than the central individual light distribution 12, which exhibits a higher intensity but narrower focusing. This results in an essentially Gaussian overall light distribution.

The left-hand part of the image in FIG. 3 shows an arrangement for a lighting apparatus 20 having an illuminant 21 and having means for setting the direction of radiation of the individual light distribution from the illuminant 21 and having means for setting the focusing of the individual light distribution from the illuminant 21, the means for setting the direction of radiation and the means for setting the focusing being formed by a liquid lens element 22 that forms the means for setting the direction of radiation and the means for setting the focusing. Provided between the liquid lens element 22 and the illuminant 21 is a primary optical element 23 that is used to take the general light distribution 24 from the illuminant 21 and produce an adjusted light distribution 25 that is then set by the liquid lens element 22 to produce a scalable individual light distribution 26. In this case, the adjusted light distribution 25 can correspond to a Gaussian curve, for example, but other distributions are likewise possible. In this case, the liquid lens element 22 and the illuminant 21 are preferably actuatable by a control means 27 in order to be able to set the intensity of the individual light distribution and/or to be able to set the direction of radiation of the individual light distribution and/or to be able to select the focusing of the individual light distribution.

FIG. 4 shows a lighting apparatus 30 according to the invention that has a multiplicity of illuminants 31 arranged in rows and columns. In this case, the illuminants 31 are arranged as a matrix, a 4×4 arrangement having been chosen in the exemplary embodiment shown. Alternatively, it is also possible for a different arrangement to be provided, as is also shown in the figures that follow, for example. In addition, it may correspond to a linear arrangement or to a matrix arrangement provided with gaps, and also to a different pattern. The illuminants 31 each have an associated primary optical system 32 and an associated liquid lens arrangement 33. The illuminants 31 and the liquid lens arrangements are preferably actuatable via the control means 34.

A lighting apparatus 30 as shown in FIG. 4 can perform selection of the individual light distributions of the illuminants 31 in accordance with the situation and/or traffic to produce a resultant overall light distribution that is dynamically selectable in accordance with the ambient situation, the situation concerning driving style and/or the traffic situation.

Figure 5:
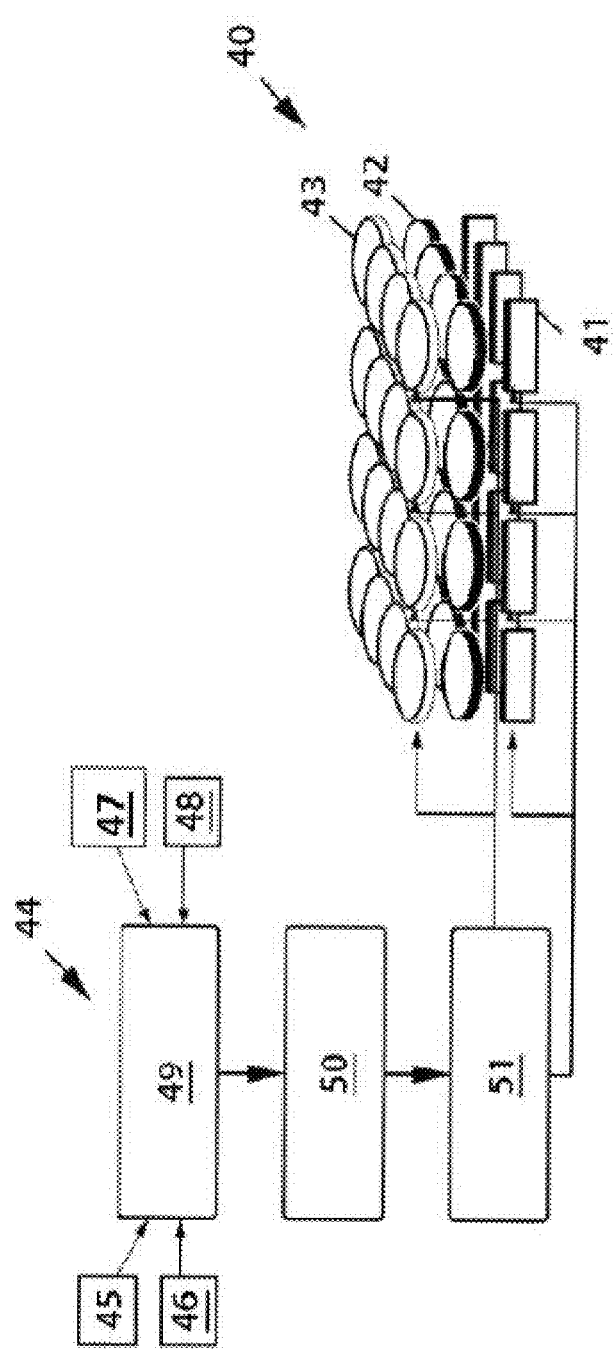
FIG. 5 shows a schematic illustration of a further example of a lighting apparatus.

FIG. 5 shows an alternative lighting apparatus 40 having a matrix arrangement of illuminants 41, primary optical systems 42 associated with each of the latter and liquid lens arrangements 43. The illuminants and the liquid lens arrangements are actuated via control means 44 in order to be able to set the direction of radiation of the individual light distributions of the illuminants and/or the focusing of the individual light distributions of the illuminants and/or the intensity of the individual light distributions of the illuminants. To this end, the control means 44 receives sensor data 45 and/or vehicle data and possibly driver inputs 46 and also possibly a set of light distributions 47 and a computation code 48 for determining the light distributions. In block 49, a decision about the desired light distribution is made within the control means, by the computation for the setpoint data for the actuation of the illuminants being determined in block 50 and the actuation of the illuminants 41 and of the liquid lens arrangements 43 being performed in block 51.

The actuation of the illuminants 41 involves the intensity, angle relative to two planes and two focus values per illuminant 41 being set.

The actuation of the liquid lens arrangement 43 involves the direction of radiation, for example as an angle relative to two planes, and/or the focusing, for example as two focus values per liquid lens arrangement 43, being set. In addition, the intensity of the illuminants 41 can be set using an intensity value.

In another variant embodiment, it is also possible for different control parameters to be selected. The parameters are obtained from an adapted light distribution that is varied from a three-dimensional basic distribution on the basis of selected altered basic parameters and, as a result, can be adjusted to suit the current traffic situation. This adaptive light distribution is then implemented as a setpoint distribution as closely as possible by the headlamp. This is accomplished by adjusting the control parameters.

FIGS. 6 and 7 show a schematic illustration of the operation of liquid lens arrangements. Such a liquid lens arrangement has two fluids 62, 63 that are arranged adjacent to one another in an axial direction, are separated by a flexible wall 61 and have different optical refractive indices. The fluids are arranged in a housing 64 that is typically in the form of an annular housing and that is closed off in the axial direction by optically transmissive plates. The perimeter has electrodes 66, 67 in a distributed arrangement on it in order to produce an electrical voltage between the electrodes in order to control the behavior of the fluids. Thus, in the left-hand part of the image in FIG. 6, a voltage U1 of 30 volts, for example, is applied between the electrodes 66, 67, so that the fluid 62 is in the form of a concave lens, so that the optical equivalent circuit diagram 68 is embodied as a concave lens. In the central region of FIG. 6, a voltage U2 of 45 volts, for example, is applied between the electrodes 66, 67, so that the interface between the fluids 62, 63 is planar, so that a planar lens is produced whose equivalent circuit diagram is in the form of a planar lens 69. Accordingly, increasing the voltage between the plano-convex lens 68 produces the transition to a planar lens 69. If the voltage is increased further, as can be seen in the right-hand part of FIG. 6, in which a voltage U3 of 60 volts, for example, is applied, then a plano-convex lens is produced between the fluids 62, 63, so that the equivalent circuit diagram yields a plano-convex lens 70. Control can also involve the use of other voltage values. By way of example, it is thus also possible, depending on the embodiment of the liquid lens arrangement, for the behavior of the lens to be controlled from a plano-concave lens to a plano-convex lens by reducing the voltage, for example.

It can be seen that simple electrical or electronic actuation of the liquid lens arrangement 60 allows control from a plano-concave lens through to a plano-convex lens. As a result, different focusings can be made possible. If the voltage is then not arranged in a manner evenly distributed over the perimeter, but rather is also modulated over the perimeter, then FIG. 7 also allows the direction of radiation to be controlled.

FIG. 7 reveals a liquid lens arrangement 80, and in the left-hand part of the image the control of the fluids 81, 82 is in a form such that the control is evenly distributed over the perimeter, so that the direction of radiation is not tilted in relation to the liquid lens arrangement in comparison with the vertical directions. In the right-hand part of the image, the actuation of the fluids is modulated in a manner distributed over the perimeter, so that the direction of radiation is tilted by the angle α in comparison with the straight direction. In this case, depending on the actuation of the applied voltage, in a manner distributed over the perimeter, essentially any direction of radiation can be selected.

FIG. 8 shows a schematic illustration of an overall light distribution 100 as a superimposition of individual light distributions 101 that are evenly distributed over the area, so that an even overall light distribution results. In this case, all the centers of the light distributions are arranged evenly and, like the centers 102a and 102b, for example, provided with a vertical distance a and a horizontal distance b in relation to one another. In addition, the expansion of all the light distributions is essentially of the same magnitude, like the expansion 103 of the light distribution with the center 102b, for example.

FIG. 9 shows an overall light distribution 110, see the left-hand illustration, that is again compiled from individual light distributions 111, see the right-hand illustration, with the individual light distributions in the center being more sharply focused essentially in the horizontal direction than at the edge. In addition, the orientation of the individual light distributions 111 is altered such that, in comparison with the arrangement in FIG. 8, they are at a greater distance at the edge, for example represented using the centers 102a, than in the center, for example represented using the centers 102b, so that the overall light distribution 110 has a higher intensity in the center than at the edge.

FIG. 10 shows an overall light distribution 120, see the left-hand illustration, that is again compiled from a multiplicity of individual light distributions 121, see the right-hand illustration, there being sharper focusing for the overall light distribution 120 because the individual light distributions are oriented more strongly toward the center and are focused more sharply essentially in the horizontal direction.

FIG. 11 again shows an overall light distribution 130, see the left-hand illustration, that is again compiled on the basis of a multiplicity of individual light distributions 131, see the right-hand illustration, with sharp focusing in the center of the overall light distribution being the result.

FIG. 12 again shows an overall light distribution 140, see the left-hand illustration, that results on the basis of a multiplicity of individual light distributions 141, see the right-hand illustration, wherein the overall light distribution represents a light distribution for a high beam from a headlamp.

FIG. 13 shows a schematic illustration of how a bright/dark boundary or an edge, see the right-hand illustration, in which there is a higher intensity of light on the left-hand side than on the right-hand side, results from superimposition of, by way of example, three individual light distributions 151, 152, 153, see the left-hand illustration, to produce an overall light distribution 154, so that an edge in the overall light distribution can arise as a result of suitable choice of the individual light distributions, for example with ever narrower focusing toward the edge. For one edge, it is also possible for more than three light distributions to be superimposed. In this case, the characterization of the edge is dependent on the number of superimposed light distributions. Bright/dark boundaries can be used in the light distribution not just to produce a low beam but rather also to open at least one tunnel having reduced intensity for at least one vehicle ahead and/or oncoming vehicle, in order to avoid dazzling the at least one other vehicle. The tunnels can have their direction, distance and width altered with the movement of the, for example one, oncoming vehicle. In this case, the number of possible tunnels is dependent on the number of available individual light distributions.

Figure 14:
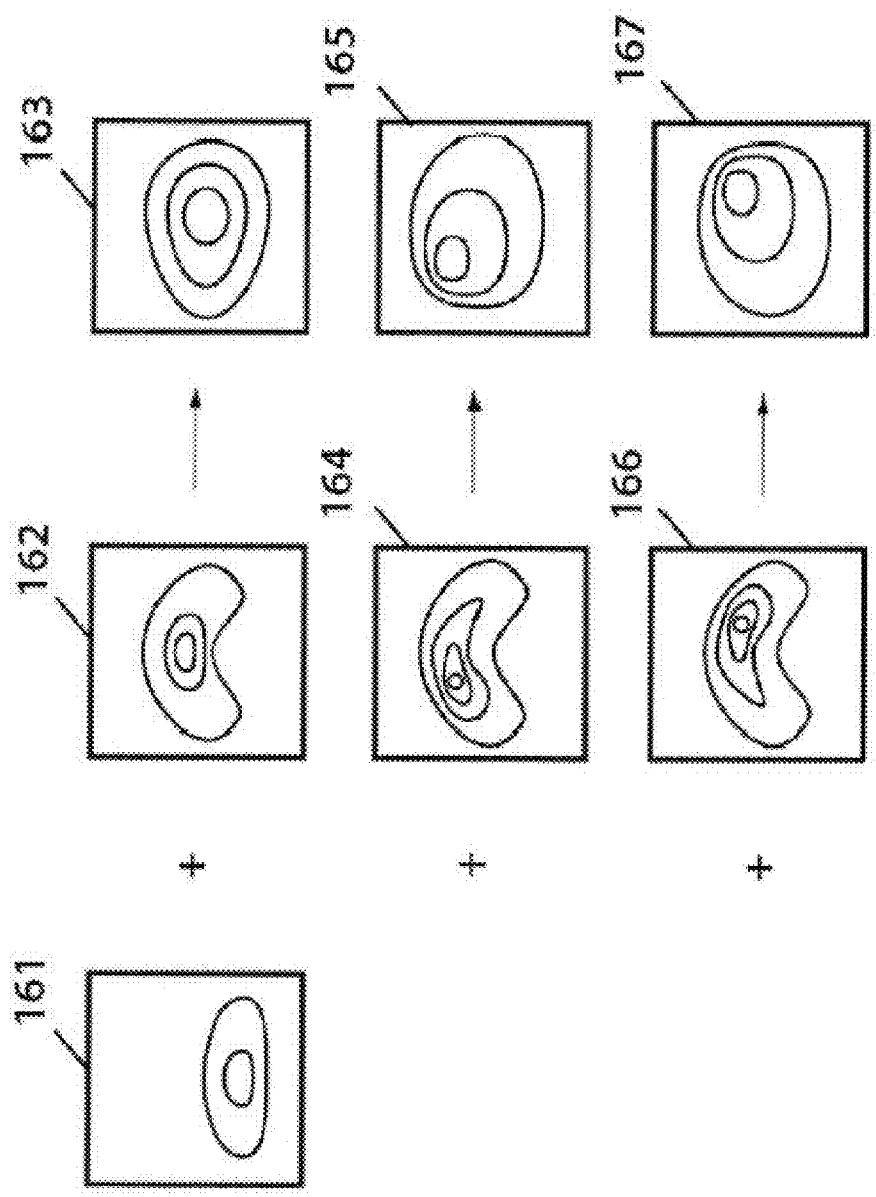
FIG. 14 shows an illustration to explain the production of an overall light distribution from a static basic light distribution and dynamically controllable light distributions.

FIG. 14 shows a schematic exemplary embodiment of a combination of static basic light distributions with dynamic controllable light distributions. In this case, the static basic light distribution 161 is added to a dynamic light distribution 162 to produce an overall light distribution 163. The structure of the basic light distribution, for example as an apron light distribution, is combined with a symmetrical dynamic light distribution 162 to produce an overall light distribution 163 for a straight road profile. Alternatively, the basic light distribution 161 can also have a dynamic light distribution 164 for a left-hand curve added to it, so that an overall light distribution 165 for a left-hand curve is the result. Alternatively, it is also possible for a dynamic light distribution 166 to be added to the basic light distribution 161, so that an overall light distribution 167 for a right-hand curve, for example, is the result.

In this case, the basic light distribution 161 at the dynamic light distributions 162, 164 or 166 are superimposed essentially throughout the solid angle range. Alternatively, the dynamic light distribution can also overlap or be combined with the basic light distribution only in a subrange, or alternatively, it is also possible for the basic light distribution 161 to be arranged in the solid angle range such that there is no resultant three-dimensional or solid-angle-like overlap with the dynamic light distributions 162, 164 or 166.

FIGS. 15 to 20 show exemplary arrangements of illuminants with appropriately arranged optical elements, such as primary optical systems and liquid lens arrangements for individually controlling the individual light distributions to produce an overall light distribution. In this case, the arrangement of the illuminants with their optical elements has provision for a respective matrix arrangement for the illuminants, the exemplary embodiments of FIGS. 15 to 20 containing a respective element that is used to produce a basic light distribution and, furthermore, a multiplicity of elements being provided that are used for producing dynamic light distributions.

Figure 15:
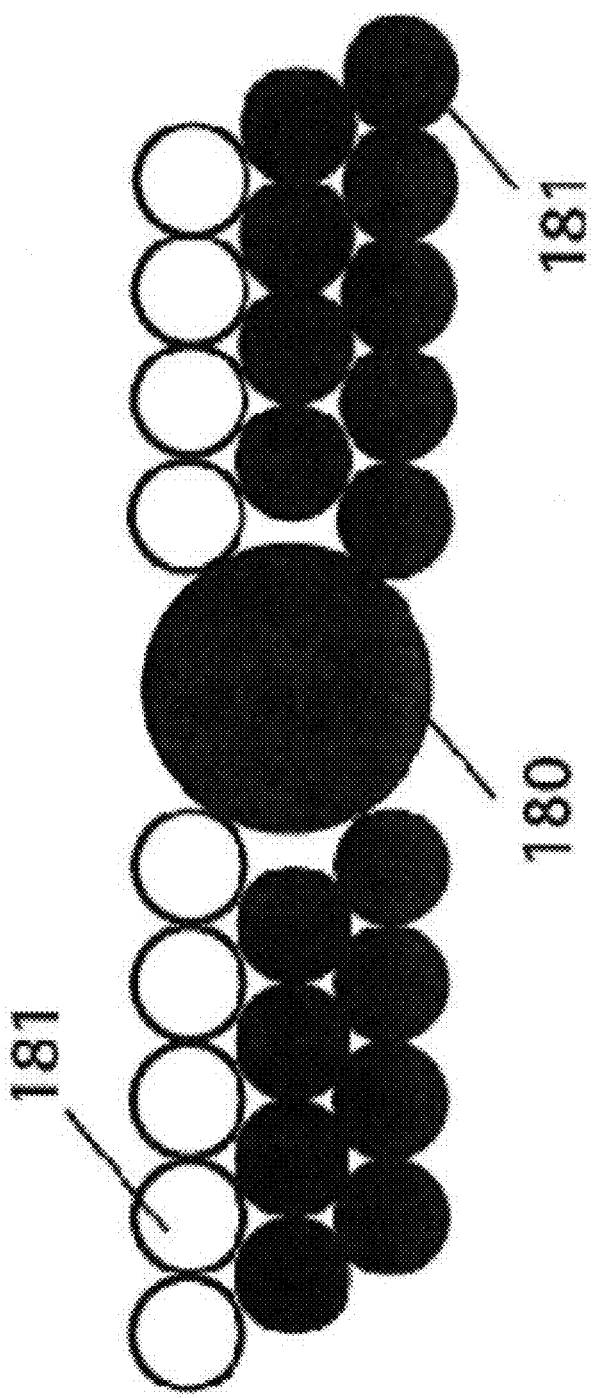
FIG. 15 shows an illustration of an example of an arrangement of illuminants.
Figure 16:
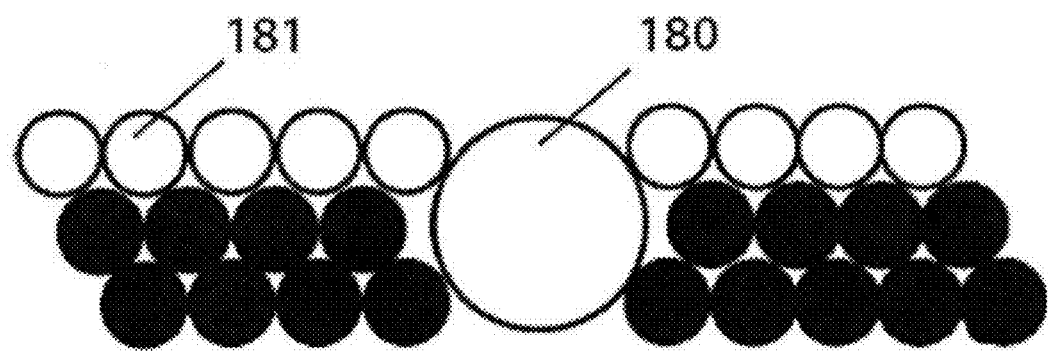
FIG. 16 shows an illustration of a further example of an arrangement of illuminants.
Figure 17:
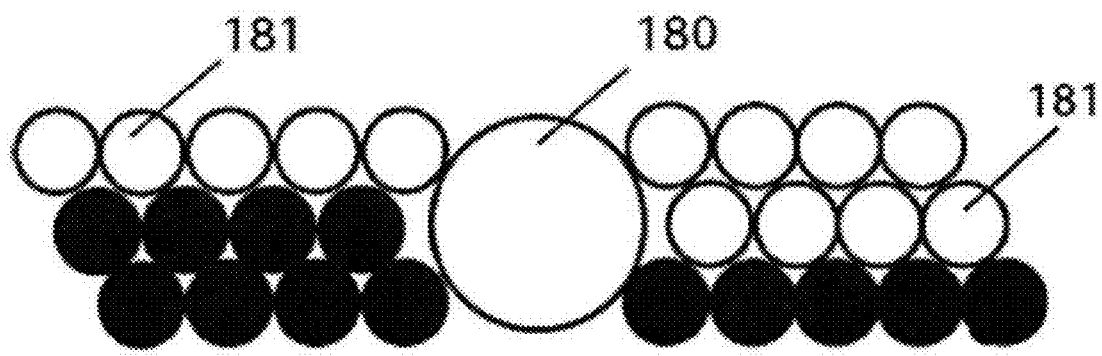
FIG. 17 shows an illustration of a further example of an arrangement of illuminants.
Figure 18:
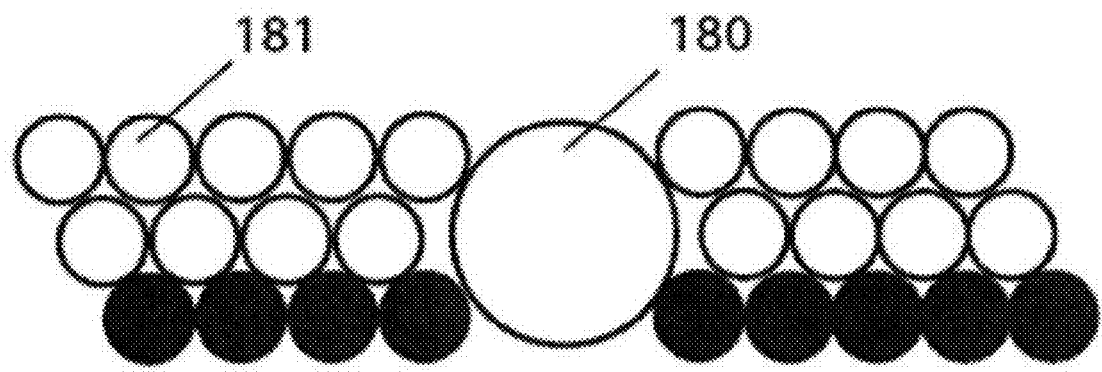
FIG. 18 shows an illustration of a further example of an arrangement of illuminants.
Figure 19:
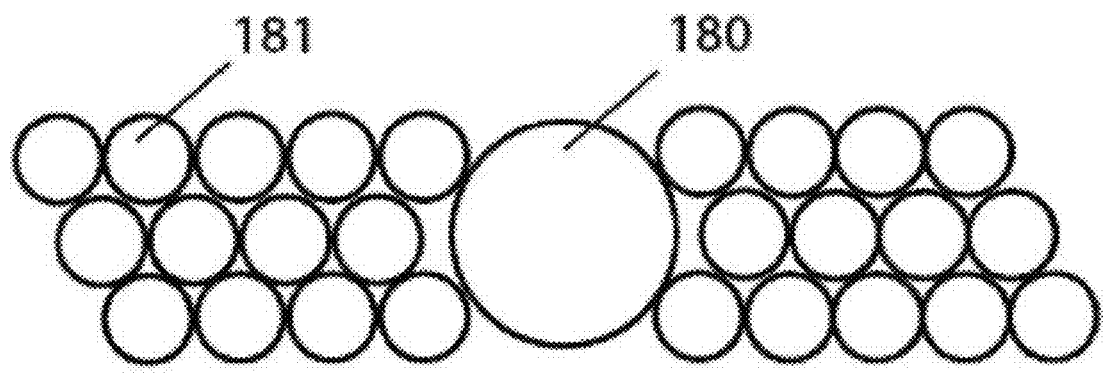
FIG. 19 shows an illustration of a further example of an arrangement of illuminants.

FIG. 15 shows an exemplary embodiment in which an element 180 is arranged centrally, a multiplicity of elements 181 being provided in three rows on both sides of the element 180. The element 180 is used to produce a static basic light distribution for the purpose of undertaking, by way of example, a static apron light distribution, the elements 181 arranged on both sides of the element 180 being used to produce a dynamic light distribution depending on actuation. In the exemplary embodiment of FIG. 15, only the elements 181 in the upper row on both sides of the element 180 are actuated, so that only these elements produce an individual light distribution in order to emit light. By way of example, the result is an overall light distribution for city lights, for example 900 lm. FIG. 16 shows a further exemplary embodiment in which the elements 181 in the topmost row are actuated, and also the element 180 for producing a low beam. The latter may be at 1800 lm, for example. The exemplary embodiment of FIG. 17 shows that the topmost row of the elements 181 and also the right-hand semi-row of the elements 181 and the element 180 are actuated, so that the result is a country road light of 2200 lm, for example. FIG. 18 shows an exemplary embodiment in which the two upper rows of the elements 181 and the element 180 are actuated to produce an overall light distribution, for example for a freeway journey at approximately 2600 lm. FIG. 19 shows an exemplary embodiment in which all of the elements 180 and 181 are actuated to produce the overall light distribution, for example for a high beam at approximately 3500 lm.

Figure 20:
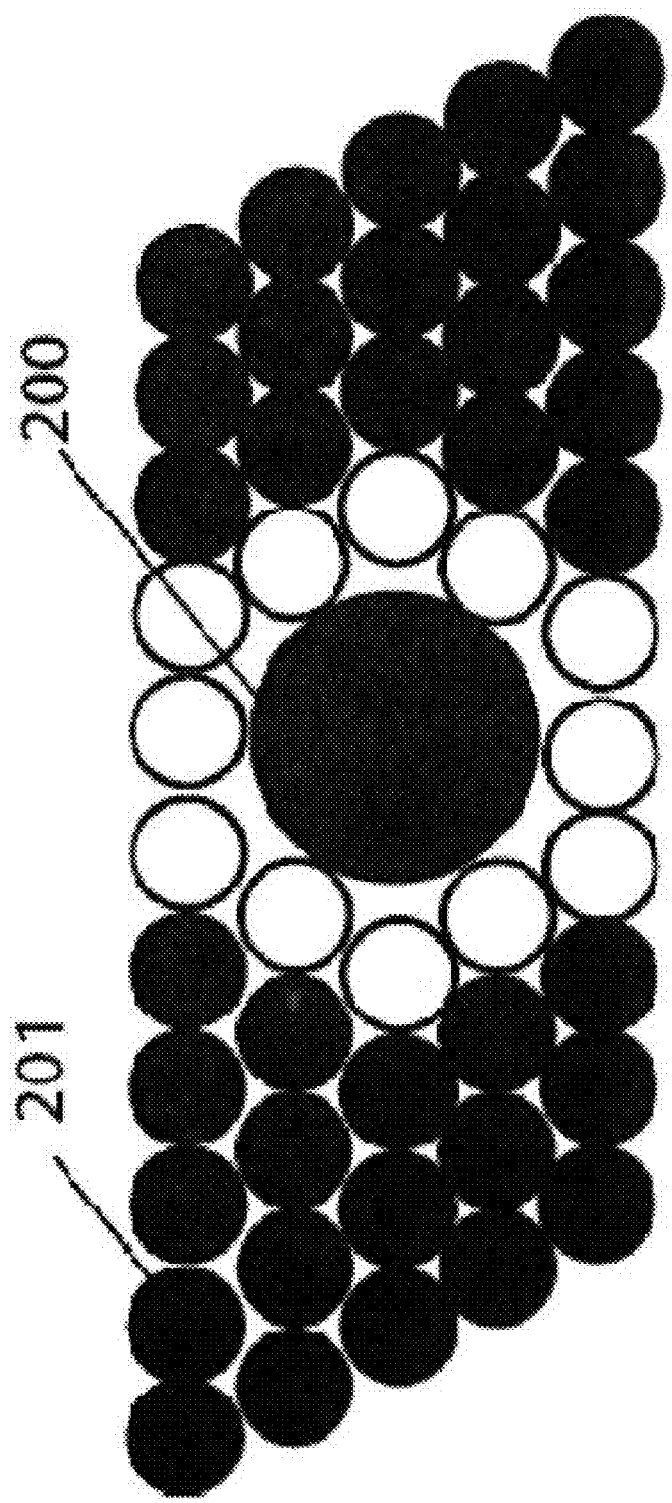
FIG. 20 shows an illustration of a further example of an arrangement of illuminants.

FIG. 20 shows a further exemplary embodiment of the arrangement of an element 200 for producing a basic light distribution and a multiplicity of elements 201, which are arranged in five rows both to the right and to the left of the element 200 and hexagonally around said element, for producing an overall light distribution, depending on the actuation, by superimposing the individual light distribution of the elements 200, 201.

In this case, the element 200 again undertakes a basic light distribution, for example for a static apron distribution, with the elements 201 producing dynamically selectable light distributions that are activable as situation-dependent light distributions.

In the exemplary embodiment of FIG. 20, only the 12 elements 201, which are arranged hexagonally around the element 200, are activated in order to bring about annular activation in order to produce a basic light distribution, for example for city lights or a low beam or daytime running lights.

Figure 21:
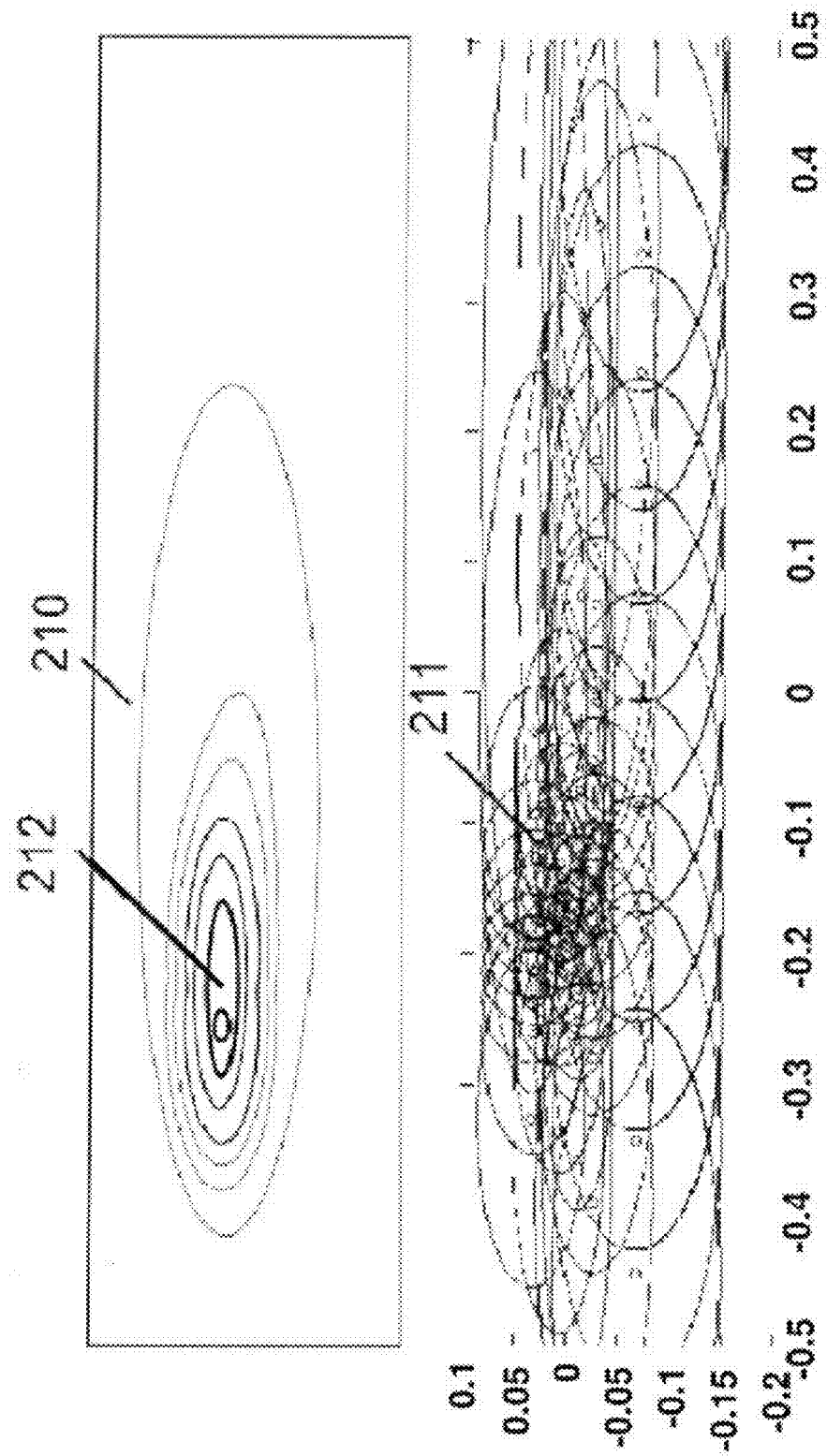
FIG. 21 shows an illustration of a further example of an overall light distribution that arises from a superimposition of individual light distributions.

FIG. 21 again shows an overall light distribution 210, see the left-hand illustration, that results on the basis of a multiplicity of individual light distributions 211, see the right-hand illustration, wherein the overall light distribution is a light distribution for a high beam from a headlamp when cornering with cornering lights. In this case, the overall light distribution in FIG. 21 is modified from the overall light distribution in FIG. 12 such that the bright spot of light 212 is deflected by a defined angle.

The method for calibrating a lighting apparatus is based on the use of a lighting apparatus that has a plurality of illuminants as light sources that each produce an individual light distribution. In this case, means for setting the direction of radiation of the individual light distribution from the illuminants and means for setting the focusing of the individual light distribution from the illuminants are provided. In addition, control means are provided for controlling the settings of the individual light distributions to produce a superimposed overall light distribution by dint of superimposition of the individual light distributions from at least single illuminants.

Figure 22:
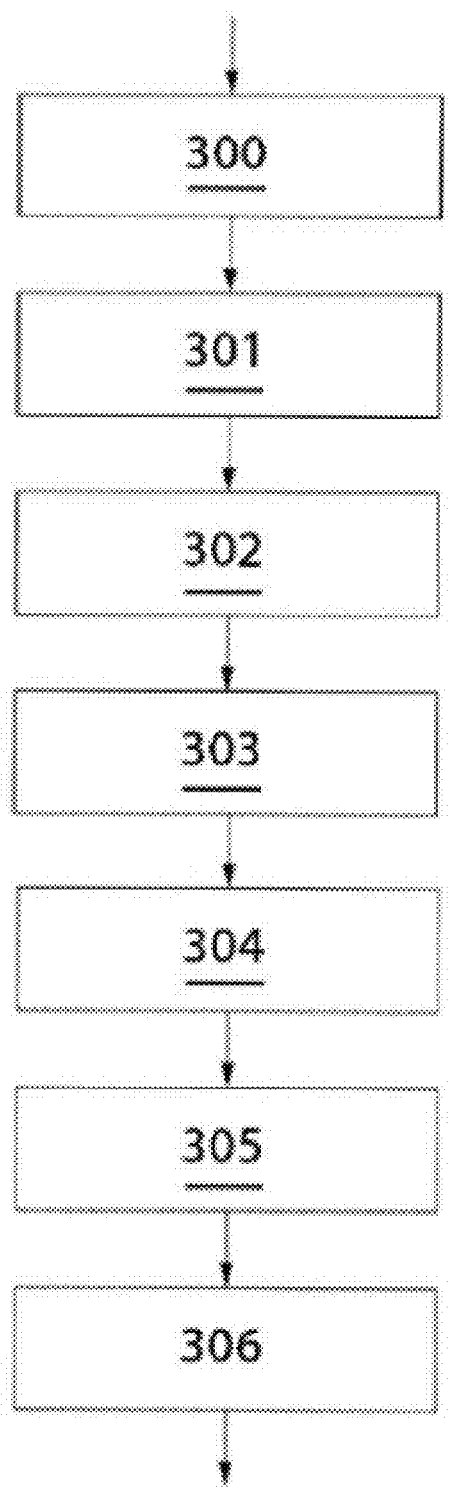
FIG. 22 shows a block diagram to explain the method according to the invention.

The method of calibration is performed, as shown in FIG. 22, such that a step 300 of the method involves the production of an essentially overlap-free distribution of the individual light distributions of at least single selected illuminants being performed. In a subsequent step 301, the light distribution for the selected illuminants is picked up by means of a sensor, for example by means of a camera. In a subsequent step 302, at least one characteristic of the picked-up individual light distributions of the selected illuminants is determined. This is followed, in a further step 303, by calibration of the lighting apparatus on the basis of a comparison of the at least one characteristic from different illuminants among one another and/or with prescribable setpoint data. Next, in step 304, the comparison is used to determine a discrepancy, and in step 305, the discrepancy is used to determine a correction value that is storable and, in accordance with step 306, is used to actuate the relevant illuminant.

In this case, the illuminant or the illuminants is/are in a form such that the intensity of the individual light distribution is adjustable, the respective intensity of the individual light distribution from the illuminants being controllable by the control means. Thus, besides the direction of radiation and/or the focusing, it is also possible to use the intensity in order to generate the overlap-free distribution of the individual light distributions.

In this case, the lighting apparatus is calibrated by setting the direction of radiation of the individual light distribution from at least one illuminant or all illuminants and/or the focusing of the individual light distribution from at least one illuminant and/or from all illuminants and/or the intensity of the individual light distribution of at least one illuminant or from all illuminants. Alternatively, the lighting apparatus can also be calibrated by setting the direction of radiation of the individual light distribution from at least one of the selected illuminants or all selected illuminants and/or the focusing of the individual light distribution of at least one of the selected illuminants and/or from all selected illuminants and/or the intensity of the individual light distribution from at least one of the selected illuminants or from all selected illuminants.

Figure 23:
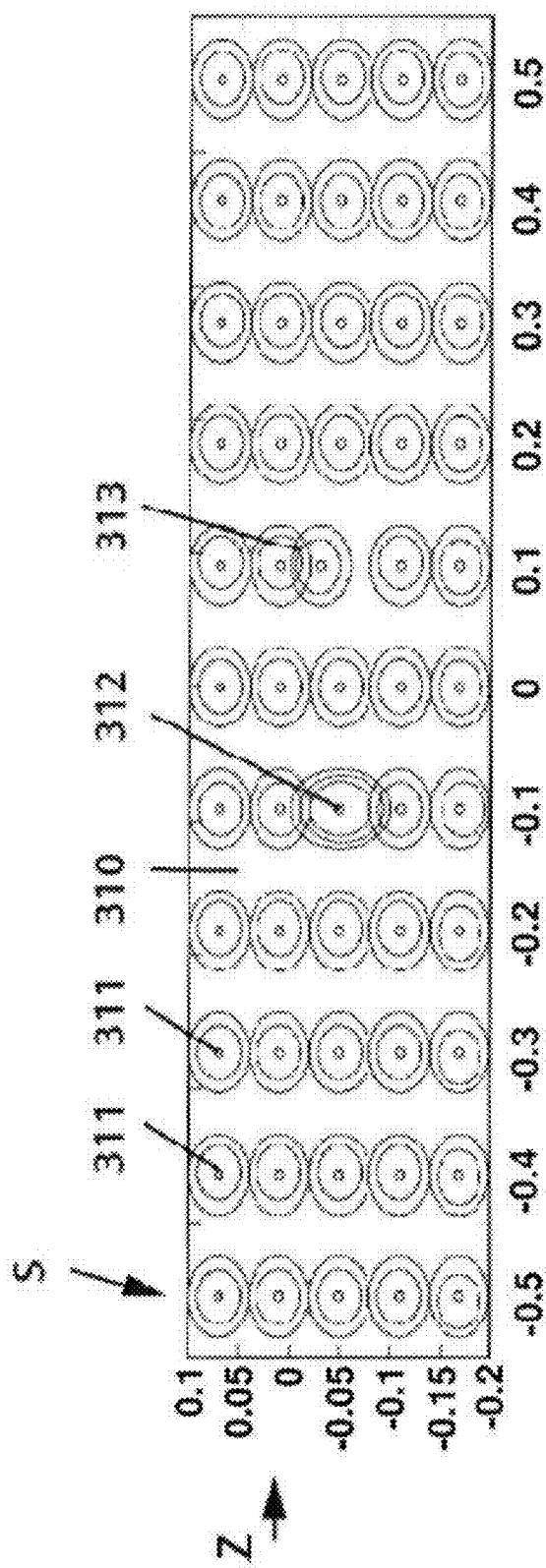
FIG. 23 shows an illustration of an overall light distribution that arises from a superimposition of individual light distributions, for calibrating the lighting apparatus.

FIG. 23 shows an overall light distribution 310 with a multiplicity of individual light distributions 311 for individual illuminants. In this case, the illuminants are arranged in rows z and columns s in a matrix arrangement, for example, so that the individual light distributions 311 likewise appear in a matrix arrangement of rows z and columns s.

It can be seen that almost all the individual light distributions are arranged regularly with an approximately round brightness profile that decreases from the center to the outside. The centers of the individual brightness profiles are arranged regularly in this case.

With two individual light distributions 312, 313 shown, on the other hand, there are discrepancies. Thus, the individual light distribution 312 has the focusing widened in the vertical direction or in the column direction and the individual light distribution 313 is shifted upward in the column direction as a round light distribution.

These discrepancies can be identified, for example by monitoring and comparing a characteristic of the individual light distribution.

In this case, the characteristic under consideration is a center or focus of an individual light distribution, as for the identification of the discrepancy in the light distribution 313.

It is also possible for the characteristic to be an expansion and/or a profile of the light distribution, as for the identification of the light distribution 312, for example.

In this case, the comparison is made as a comparison for centers and/or expansion parameters and/or profile parameters of light distributions that are ascertained from different illuminants. In this way, individual light distributions are thus compared with one another.

Alternatively or additionally, the comparison may be a comparison of centers and/or expansion parameters and/or profile parameters of light distributions that are compared with setpoint positions, setpoint expansions and/or setpoint profiles. As a result, a comparison is made not with one another but rather with prescribable values.

In this case, the calibration is advantageously effected by virtue of the production of an essentially overlap-free distribution of the individual light distributions being performed over an area in front of the vehicle. The area is advantageously an at least essentially even area that has a horizontal or vertical profile, in particular. This avoids distortions. The area may also be a selected area or is a subregion of a selected area in which the operation of the headlamp is essentially unimpaired and/or the driver of the vehicle and/or other road users are not disturbed or influenced. It is thus advantageous if the area is not visible to the driver of the vehicle. As a result, the calibration also does not produce any irritation for the driver.

According to the invention, the method for calibration can be performed in one step, for example during the production, assembly or commissioning of the lighting apparatus.

Alternatively, the method for calibration can also be performed cyclically in multiple calibration cycles. In this case, the method for calibration can be performed such that only a portion of the illuminants of the lighting apparatus are calibrated in a calibration cycle, different calibration cycles involving different portions of the illuminants being calibrated. In this case, after a complete pass through the calibration cycles, essentially all illuminants can advantageously be calibrated.

In this case, the selected illuminants for calibration can be selected such that they are currently not used to produce a light distribution that is needed on account of the situation, or such illuminants as are also used for producing the required light distribution are used but they are at least intermittently replaced by other illuminants. This may be a light distribution that is required on account of traffic, on account of surroundings, on account of settings or on account of other parameters.

In a further alternative, it is also possible if only one individual light distribution for an illuminant at a time is calibrated in a calibration cycle. In this case, this can be performed in successive cycles, so that after the performance of all cycles, all illuminants have been calibrated.

FIG. 23 shows an overall light distribution on the basis of a multiplicity of individual light distributions that represents production of the overlap-free distribution of the individual light distributions. In this case, the individual light distribution can be effected in at least one of various settings of the illuminants. This setting can be set as a setting for a central position, a, in particular extreme, swivel position, a, in particular extreme, focusing and/or an, in particular extreme, expansion.

Instead of a static setting, it is in this case alternatively possible to make a dynamic setting for the individual light distribution or the light distributions. This can be set as swiveling and/or circling and/or expansion and contraction.

When the calibration of a lighting apparatus of a motor vehicle is performed, the calibration can be performed when the motor vehicle is at a standstill. It is also possible for the calibration to be performed during a driving situation of the motor vehicle while traveling.

LIST OF REFERENCE SYMBOLS

1 Overall light distribution
2 Individual light distribution
3 Illuminant
11 Overall light distribution
12 Individual light distribution
13 Illuminant
20 Lighting apparatus
21 Illuminant
22 Liquid lens element
23 Primary optical element
24 Light distribution
25 Light distribution
26 Individual light distribution
27 Control means
30 Lighting apparatus
31 Illuminant
32 Primary optical system
33 Liquid lens arrangement
34 Control means
40 Lighting apparatus
41 Illuminant
42 Primary optical system
43 Liquid lens arrangement
44 Control means
45 Sensor data
46 Driver input
47 Set of light distributions
48 Computation code
49 Block
50 Block
51 Block
60 Liquid lens arrangement
61 Wall
62 Fluid
63 Fluid
64 Housing
65 Plate
66 Electrode
67 Electrode
68 Equivalent circuit diagram
69 Equivalent circuit diagram
70 Equivalent circuit diagram
80 Liquid lens arrangement
81 Fluid
82 Fluid
100 Overall light distribution
101 Individual light distribution
110 Overall light distribution
111 Individual light distribution
120 Overall light distribution
121 Individual light distribution
130 Overall light distribution
131 Individual light distribution
140 Overall light distribution
141 Individual light distribution
150 Bright/dark boundary
151 Individual light distribution
152 Individual light distribution
153 Individual light distribution
154 Overall light distribution
161 Basic light distribution
162 Dynamic light distribution 163 Overall light distribution
164 Dynamic light distribution
165 Overall light distribution
166 Dynamic light distribution
167 Overall light distribution
180 Element
181 Element
200 Element
201 Element
210 Overall light distribution
211 Individual light distribution
212 Spot of light
300 Step
301 Step
302 Step
303 Step
304 Step
305 Step
306 Step
310 Overall light distribution
311 Individual light distribution
312 Individual light distribution
313 Individual light distribution

The invention claimed is:

1. A method for calibrating a lighting apparatus, the method comprising:
    providing a lighting apparatus having a plurality of illuminants and a control element for individually controlling the settings of each illuminant of the plurality of illuminants,
    producing a first superimposed overall light distribution by dint of superimposition of individual light distributions produced by an at least one illuminant of the plurality of illuminants,
    producing a second essentially overlap-free light distribution from at least one selected illuminant of the plurality of illuminants,
    using a sensor to detect the second light distribution,
    independently determining at least one characteristic of each of the individual light distributions of the at least one selected illuminant,
    calibrating the lighting apparatus by comparing the at least one characteristic of each of the individual light distributions among one another or with prescribable setpoint data.

2. The method according to claim 1, further comprising determining a discrepancy in an individual light distribution from a setpoint value, from which a correction value for actuating the selected illuminant is determined, so that the discrepancy is reduced.

3. The method according to claim 2, wherein the correction value is stored and is used or taken into account during operation of the illuminant.

4. The method according to claim 1, wherein each illuminant of the plurality of illuminants individually comprises an element for controlling the direction of radiation of the individual light distribution an element for controlling the focusing of the individual light distribution.

5. The method according to claim 1, wherein the intensity of each illuminant of the plurality of illuminants is individually adjustable by the control element.

6. The method according to claim 1, further comprising performing a calibrating or ascertaining of control parameters for a lighting apparatus of a motor vehicle during a standstill or after the production of the motor vehicle.

7. The method according to claim 1, further comprising performing a calibrating or ascertaining of control parameters for a lighting apparatus of a motor vehicle during a driving situation of the motor vehicle.

8. The method according to claim 1, wherein the at least one characteristic is a center or focus of an individual light distribution.

9. The method according to claim 1, wherein the at least one characteristic is an expansion or a profile of the individual light distribution.

10. The method according to claim 1, wherein comparing the at least one characteristic of each of the individual light distributions is a comparison of centers or of expansion parameters or of profile parameters from light distributions that are ascertained from different illuminants.

11. The method according to claim 1, wherein comparing the at least one characteristic of each of the individual light distributions is used to examine at least one regularity.

12. The method according to claim 1, wherein comparing the at least one characteristic of each of the individual light distributions is a comparison of centers or of expansion parameters or of profile parameters from light distributions that are compared with setpoint positions, setpoint expansions, or setpoint profiles.

13. The method according to claim 1, wherein producing an essentially overlap-free distribution of the individual light distributions is performed over an area in front of the vehicle.

14. The method according to claim 13, wherein the area is an at least essentially even area that has a horizontal or vertical profile.

15. The method according to claim 13, wherein the area is a selected area or is a subregion of a selected area in which the operation of the headlamp is essentially unimpaired and the driver of the vehicle and other road users are not disturbed or influenced.

16. The method according to claim 15, wherein the area is not visible to the driver of the vehicle.

17. The method according to claim 1, wherein the method for calibration is performed cyclically in multiple calibration cycles.

18. The method according to claim 17, wherein the method for calibration is performed such that only a portion of the illuminants of the lighting apparatus are calibrated in a calibration cycle, different calibration cycles involving a respective different portion of the illuminants being calibrated.

19. The method according to claim 17, wherein after a complete pass through the calibration cycles, essentially all illuminants are calibrated.

20. The method according to claim 17, wherein the selected illuminants for calibration are selected such that they are currently not used to produce a light distribution that is needed on account of the situation, or such illuminants are used but they are at least intermittently replaced by other illuminants.

21. The method according to claim 1, wherein only one individual light distribution for an illuminant at a time is calibrated in a calibration cycle.

22. The method according to claim 1, wherein the production of the overlap-free distribution of the individual light distributions is performed in at least one of various settings for the illuminants.

23. The method according to claim 18, wherein the setting that is set is a central position, a swivel position, a focusing or an, expansion.

24. The method according to claim 1, wherein a dynamic setting for the individual light distribution or for the light distributions is made.

25. The method according to claim 1, wherein swiveling or circling or expansion and contraction is set.

26. A method for actuating a lighting apparatus, the method comprising:
- providing a lighting apparatus having a plurality of illuminants and a control element for individually controlling the settings of each illuminant of the plurality of illuminants,
- producing a first superimposed overall light distribution by dint of superimposition of individual light distributions produced by an at least one illuminant of the plurality of illuminants,
- producing a second essentially overlap-free light distribution from at least one selected illuminant of the plurality of illuminants at a selected time,
- using a sensor to detect the second light distribution or the individual light distributions from the at least one selected illuminant,
- independently determining and storing at least one characteristic of each of the individual light distributions,
- actuating the lighting apparatus during operation based on the at least one characteristic.

27. The method according to claim 26, wherein the lighting apparatus is actuated by determining the difference between the at least one characteristic and a setpoint value for the at least one characteristic.

28. The method according to claim 1, wherein the calibration is performed by setting the direction of radiation of the individual light distribution, the focusing of the individual light distribution, or the intensity of the individual light distribution.

29. The method according to claim 28, wherein every illuminant of the plurality of illuminants produces an individual light distribution.

* * * * *